Patented Feb. 11, 1941

2,231,597

UNITED STATES PATENT OFFICE 2,231,597

PROCESS OF OBTAINING FUEL OIL FROM DIGESTED SLUDGE

Saburo Shibata, Oji-ku, Tokyo, Japan

No Drawing. Application September 26, 1938, Serial No. 231,839. In Great Britain May 16, 1938

2 Claims. (Cl. 210—1)

This invention relates to a process of manufacturing liquid fuel oil from digested sludge derived from the digestion of such matters as sewage sludge, human fecal matters, garbage and other wastes which consist of animal or vegetable organic matters.

The above-mentioned organic matters are digested in the digestion tank by the action of anaerobic bacteria, and the evolution of methane and carbondioxide will take place together with the formation of hydrocarbons. I have found that liquid fuel oil resembling natural petroleum can be obtained by distilling such digested sludges in a retort. According to this invention, therefore, dried or wet digested sludges are put into a retort and distilled under normal pressure or elevated pressure, preferably utilizing as fuel the methane generated in the digestion tank.

One of the objects of this invention is to obtain new liquid fuel oil which resembles natural petroleum from digested sludges by a simple process in most economical manner.

Another object of the invention is to obtain as byproduct a bone-charcoal-like product which may be used as decolorizer or absorbent.

In carrying out the invention, the organic matters are changed to hydrocarbons by the action of anaerobic bacteria which thrive in the weak alkaline zone in the digestion tank and these hydrocarbons are absorbed by the inorganic matters in the sludge such as clay or sand to form kerogen which changes to petroleum gas by heating. Digested sludge which contains kerogen is put into a retort and heated up to 450° C. For the heating, the methane derived from the digestion of organic matters may be utilized, or any other fuels may be used. Gas from the retort is cooled with air or water and condensed into crude fuel oil.

One example of the process is as follows:

Sewage sludge with 92% moisture is digested in the digestion tank for one month at the temperature of 25° C. under the controlled pH value from 7.2 to 7.5. Digested sludge thus obtained has a faint phenol odor. This digested sludge is dried in sand beds and put into an iron retort and is heated by the combustion of methane from the digestion tank or by any other fuels. The temperature is raised gradually up to 400° C., and about 8–10% of crude oil is distilled together with brown liquor rich in ammonia. The crude oil which is washed with hot water to remove ammonia compound has the following character:

| | |
|---|---|
| Specific gravity (15° C.) | 0.9250 |
| Viscosity (0° C.) seconds | 110 |
| Flashing point degrees C | 98 |
| Heat value (Cal./kg.) | 10,350 |
| Carbon per cent | 85.21 |
| Hydrogen do | 10.59 |
| Oxygen do | 1.4 |
| Nitrogen do | 2.65 |
| Sulphur do | 0.15 |

The fractional distillation of the crude oil yields 17.5% of crude gasoline and 7.25% of light oil (Diesel oil) and 10.0% of pitch.

The composition of the crude gasoline is as follows:

| | Per cent |
|---|---|
| Unsaturated hydrocarbons | 38.0 |
| Aromatic hydrocarbons | 25.2 |
| Naphthalene series hydrocarbons | 15.3 |
| Paraffin series hydrocarbons | 21.6 |

The amount of ammonia contained in the liquor averages 5–11 kg. from one ton of dried digested sludge and may be converted into about 2.0% of ammonium sulphate by neutralization. Combustible gases from the retort amount to about 200 litres per kg. volatile solid in the digested sludge and have the following character:

| $CO_2$ | $C_nH_{2n}$ | $O_2$ | $CO$ | $H_2$ | $CH_4$ | Other gases | Cal./m.³ |
|---|---|---|---|---|---|---|---|
| 22.9 | 3.3 | 0.4 | 1.5 | 32.1 | 34.1 | 5.7 | 4,300 |

The residue from retorting resembles somewhat bone charcoal and has the property of absorbing and decolorizing, and it may be used as decolorizer or absorbent.

What I claim is:

1. In a process for the production of oil of the character of natural petroleum, the steps which comprise subjecting sewage sludge to anaerobic digestion at a temperature of about 25° C. and at a pH of about 7.2–7.5 until a phenolic odor develops, whereby organic matter in the sludge is converted into hydrocarbon form, said hydrocarbon being thereupon absorbed by inorganic matter present in the sludge to form kerogen, then heating the resultant kerogen-containing sludge up to a temperature of about 400-450° C. whereby distillation of distillable matters takes place, and condensing and collecting the resultant crude oil-containing and ammonia-containing distillate.

2. In a process as defined in claim 1, the further steps of separating the crude oil from the said distillate and fractionally distilling the said oil to provide fractions severally consisting essentially of crude gasoline, light oil and pitch, respectively.

SABURO SHIBATA.